United States Patent Office 3,401,186
Patented Sept. 10, 1968

3,401,186
PROCESS FOR ALKYLATING, ALKENYLATING, ARYLATING AND REDUCING METAL SALTS
Richard Müller and Christian Dathe, Radebeul, Germany, assignors to Institut für Silikon- und Fluorkarbon-Chemie, Radebeul, near Dresden, Germany
No Drawing. Filed Mar. 26, 1965, Ser. No. 443,094
8 Claims. (Cl. 260—430)

ABSTRACT OF THE DISCLOSURE

A process for the alkylation, alkenylation or arylation of salts of a metal selected from the group consisting of silver, gold, copper and mercury, which comprises reacting said metal salt with a trifunctional organosilane or a salt of an organopentafluorosilicic acid in the presence of a fluoride. In the case that the metals are silver, copper or gold, which form unstable alkylation, alkenylation or arylation products, the latter are subsequently decomposed with formation of metallic silver, gold or copper, respectively.

---

The present invention is concerned with a process for carrying out alkylations, alkenylations, arylations and reductions with the use of trifunctional organo-silanes.

Organo-silicon compounds are characterised by an especial stability of the Si-C bond. Use is made of this property in many technical fields in the production of temperature-stable and hydrolysis-stable, as well as substantially chemical-stable, synthetic materials, the silicones. A loosening of the Si-C bond only occurs when the inherently weak polarity of the Si-C bond is strengthened. This can take place, for example, by the replacement of hydrogen in the alkyl group by halogen or another strongly electronegative atom or atomic grouping. Thus, for example, in the case of the treatment of perfluoroalkyl chlorosilanes with aqueous hydrofluoric acid, not only are the chlorine atoms attached to the silicon atom replaced by fluorine atoms but a complete fission of the Si-C bond also takes place:

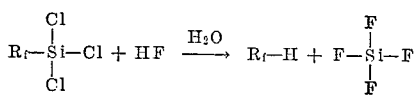

In the above equation, $R_f$ denotes a perfluoroalkyl radical. In contradistinction thereto, for example, methyl, ethyl and phenyl chlorosilanes react under the same conditions only with the formation of the corresponding organotrifluorosilanes.

We have now found that the Si-C bond, even in the last-mentioned, very stable, trifunctional alkyl, alkenyl and aryl silicon compounds, can be completely split at room temperature, whereby, in the presence of fluorine ions, salts of heavy metals are alkylated, alkenylated or arylated.

If a dilute solution of silver nitrate is added dropwise to phenyl trifluorosilane in an aqueous solution of ammonium fluoride, then an almost instantaneous yellow or orange coloration occurs and an identically coloured precipitate of silver phenyl ($AgC_6H_5$), stabilized by silver nitrate, separates out and which finally decomposes, especially in the presence of light and at relatively low temperatures, with the separation of silver. This reaction can be carried out with organo-trifluorosilanes and the corresponding organo-silver intermediate compounds are obtained. Thus, under appropriate conditions, methyl trifluorosilane forms yellow to orange coloured silver methyl, clearly with the addition of silver nitrate. The reaction with vinyl trifluorosilane results in the separation of a deep blue intermediate compound which finally decomposes into silver, in the form of beautifully formed specula, and butadiene. Instead of silver nitrate, other soluble silver salts, such as silver fluoride, can be used with similar results.

The process is, however, by no means limited to silver. If, for example, copper sulphate solution is reacted with phenyl trifluorosilane in a solution of ammonium fluoride, then reduction occurs via the intermediate step of an organo-copper compound. A similar course of reaction is observed in the case of the use of a solution of gold chloride.

If metals are used which form air- and moisture-stable organic compounds, then the reaction stops at the alkylation, alkenylation or arylation stage and the organometallic compound can be isolated. Thus, for example, by pouring an aqueous solution of mercuric chloride or mercuric nitrate into a solution of an organotrifluorosilane, there is obtained, in a simple manner, the corresponding, difficulty soluble organo-mercury chloride or nitrate, which precipitates out almost quantitatively and can be isolated in known manner or can be converted into the diorgano-mercury compounds. If mercurous compounds, such as mercurous nitrate, are used, then the grey coloration formed indicates that the corresponding divalent mercury compound, for example, mercuric nitrate, is formed, together with metallic mercury.

Instead of organo-trifluorosilanes, there can, with advantage, be used the salts of organo-pentafluorosilicic acid. However, a corresponding reaction is even achieved when non-fluorine-containing trifunctional organo-silicon compounds, such as sodium vinyl siliconate, is treated with for example, silver nitrate and fluoride solutions.

The preparation of alkali metal organosiliconates such as the sodium vinyl siliconate, is known from the literature. See H. Reuther, "Silikone," Steinkopf publishers, Dresden, 1959, page 159 and following, or H. Reuther and S. Munkelt, "Die Technik" 12 (1957) 704.

The above mentioned organo-pentafluorosilicates are novel compounds. They, as well as their preparation, are described in our copending application filed the same day, entitled "Method of Producing Salts from Organo-Fluosilicic Acids," Ser. No. 443,087.

The process according to the present invention is not limited to the use of solvents, such as water. On the contrary, the reaction components also react with one another in an undissolved state. Thus, for example, by grinding solid silver nitrate with solid ammonium phenyl pentafluorosilicate to form an intimate mixture of the same, a yellow and grey-brown coloration appears after a short time, which indicates the course of the reaction in the manner described for the aqueous solution.

From the described embodiments of the process according to the instant invention, there are indicated significant advantages for carrying out alkylations, alkenylations, arylations and reductions. Thus, it is of especial advantage that the reactions can be carried out by simply mixing aqueous solutions and that almost quantitative yields are obtained; in most cases even without heating. If there are thereby formed unstable organo-metallic compounds, such as those of copper or silver, then the reaction proceeds in the manner of a redox reaction and can be used as such.

Accordingly, an object of this invention is to provide a unique and hitherto unknown methods for obtaining organic radicals in an aqueous solution, or in the absence of a solvent.

Since the organo-trifluorosilanes are, in general, substantially more readily available than the corresponding tetraorgano-lead and -tin compounds, which have hitherto mainly been used for the production of organosilver compounds (Krause and Schmitz, Berichte, 52, 2159 and 2161, G. Semerano and L. Riccoboni, Berichte, 74, 1099, H. Gilman and L. A. Woods, J.A.C.S. 65, 435 (1943)), the new process according to the present invention also is of advantage with regard to the starting materials used. Compounds, such as silver vinyl, could not be prepared by the previously known process and are, therefore, new.

The production of stable organo-metallic compounds, such as those from organo-mercury halides, in aqueous solution has also not previously been described. Here, too, the production possibilities are considerably extended and simplified by the process according to the present invention.

The following examples are illustrative only and are not intended as restrictive of the invention.

EXAMPLE 1

12 g. ammonium phenyl pentafluorosilicate, $$(NH_4)_2[C_6H_5 \cdot SiF_5]$$

dissolved in 120 g. 2% aqueous ammonium fluoride solution, are mixed with a solution of 8.5 g. silver nitrate in 100 ml. water, whereby the solution immediately becomes yellow and then orange. Upon vigorous stirring, an identically coloured precipitate separates out in a flocculant state and is filtered off with suction and washed. Upon drying, the colour soon changes through brown to black. It proves to be practically free of silicon, ammonium ions and fluorine ions and contains carbon, hydrogen, silver and silver nitrate. The latter can be demonstrated by boiling with water and subsequent precipitation with hydrochloric acid (Krause and Schmitz, Berichte, 52, 2150/ 1919). Upon heating the dry substance in a small ignition tube, spontaneous decomposition occurs, sometimes with the appearance of burning.

If a small amount of solid silver nitrate is ground with some ammonium phenyl pentafluorosilicate, then the mixture becomes yellow in colour. The yellow colour is not stable for very long.

EXAMPLE 2

150 ml. of a 17% silver nitrate solution are added dropwise, with stirring, to 39 g. ammonium vinyl pentafluorosilicate, $(NH_4)_2[CH_2\text{-}CH \cdot SiF_5]$ dissolved in 325 g. 2% ammonium fluoride solution, whereby a dark blue color forms and, after about 10 minutes, gas evolves with the formation of a considerable amount of foam and the slight liberation of heat. The reaction mixture becomes grey. The gas which is given off (butadiene) is collected in a receiver cooled to −78° C. (about 4 ml.) and subsequently distilled through a cooled column. The 0.5 g. of distillate obtained from 2 g. of substance is brominated by the addition of a solution of bromine in chloroform. After evaporation of the solvent and of excess bromine on a water bath, there are obtained 1.8 g. of residue, which solidifies substantially completely, and is washed with petroleum ether and pressed on clay. The compound is in the form of needles with a melting point of 115.5–116.5° C. After recrystallisation from alcohol, the compound melts at 117° C. and agrees with the melting point of 1,2,3,4-tetrabromobutane (Thiele, Annalen, 308, 337/ 1899). The compound contains 84.6% bromine and the calculated bromine content is 85.53%.

If a solution of silver fluoride is used instead of a solution of silver nitrate, then the same reaction takes place, as can be recognised by the violet to blue coloration and gas evolution, with the separation of silver.

EXAMPLE 3

1 g. ammonium methyl pentafluorosilicate, $$(NH_4)_2[CH_3 \cdot SiF_5]$$

dissolved in 4.5 ml. 37% ammonium fluoride solution, is mixed with 1 g. silver nitrate, dissolved in about 7 ml. water. A yellow coloration immediately occurs which rapidly changes through orange to dark grey and subsequently lightens somewhat, a slight evolution of heat also being observed. The gas which is evolved is passed over solid potassium hydroxide and collected in a gas burette. By means of gas chromatography, it can be shown that the gas consists of 93.7% ethane and 6.3% methane.

A yellow coloration with a rapid colour change to grey is also observed when solid silver nitrate is ground with dry ammonium methyl pentafluorosilicate.

EXAMPLE 4

An aqueous solution of sodium vinyl siliconate is mixed with 45.5% ammonium fluoride solution, whereby a thick, white precipitate is thrown out. If a solution of silver nitrate is now added, then there is observed the blue-black coloration typical for the vinyl compound. If a solution of sodium phenyl siliconate is used, then, with the same treatment, a yellow coloration occurs which gradually changes to black.

EXAMPLE 5

12 g. ammonium phenyl pentafluorosilicate, dissolved in 66.5 g. 2% ammonium fluoride solution, are mixed with a solution of 11.2 g. mercuric chloride in 160 g. water. There is immediately formed a thick, white precipitate which settles out well and is filtered off with suction, washed three times with cold water and dried over phosphorus pentoxide. There are obtained 14 g. of material which is still somewhat moist. After recrystallisation from alcohol, the compound melts at 249–250° C. The yield is 11 g. According to Beilstein, phenyl mercuric chloride melts at 250–251° C.

EXAMPLE 6

9.5 g. ammonium vinyl pentafluorosilicate, dissolved in 30 g. 2% ammonium fluoride solution, are mixed with 11.2 g. mercurous chloride in 160 g. water. The reaction proceeds as in Example 5. The yield of crude product is 10 g. After recrystallisation from 100 g. alcohol, the melting point is 174–176° C. Yield: 6 g. The substance crystallises in large, shiny, colourless flakes with a repulsive odour which adheres strongly to the skin.

EXAMPLE 7

9 g. ammonium methyl pentafluorosilicate, dissolved in 30 g. ammonium fluoride solution, is mixed with 11.2 g. mercuric chloride, dissolved in 160 g. water. The reaction proceeds as in Example 5. The yield of crude reaction product is 9–10 g. It has a repulsive odour and crystallises in shiny, colourless leaflets which, after recrystallisation from alcohol, melt at 167–168° C. According to Beilstein, methyl mercuric chloride melts at 167° C. (170° C.).

The compounds obtained according to Examples 5–7 were dissolved in hot alcohol and were shown to contain chlorine by the addition of an alcoholic solution of silver nitrate.

EXAMPLE 8

12 g. ammonium phenyl pentafluorosilicate, dissolved in 65 g. 2% ammonium fluoride solution, are mixed with 18 g. mercuric nitrate $(HgNO_3)_2 \cdot 2H_2O$, dissolved in a mixture of 90 g. water and 15 ml. 2 N nitric acid. The reaction proceeds as in Example 5. The yield of crude product is 16.5 g. After recrystallisation from a small amount of alcohol, the fine crystalline powder obtained melts, with decomposition, at 186° C. According to Beilstein, phenyl mercuric nitrate melts, with decomposition, at 176–186° C.

EXAMPLE 9

A solution of copper sulfate is added to an aqueous solution of ammonium methyl pentafluorosilicate. After a short time, coloration occurs, together with the evolution of gas and a brown precipitate separates out.

If there is used an aqueous solution of ammonium phenyl pentafluorosilicate, then, upon the addition of a solution of copper sulphate, there separates out a yellow precipitate which becomes red-brown. Ammonium vinyl pentafluorosilicate decolorised copper sulphate solution at room temperature. If the solution is heated, then copper separates out, partially in the form of a mirror. However, under certain circumstances, an excess of fluorine ions can disturb the reaction with copper sulphate.

EXAMPLE 10

An aqueous solution of ammonium phenyl pentafluorosilicate is added dropwise to an aqueous solution of gold chloride contain 1 g. of gold chloride in 29.4 ml. of solution. A reaction occurs at room temperature and a dark brown precipitate settles out.

If the reaction is carried out with ammonium methyl pentafluorosilicate, then, in addition, the evolution of gas occurs.

Under certain circumstances, excess fluorine ions can here, too, have a disturbing effect on the reaction.

As various changes might be made in the embodiment of the invention herein shown without departing from the spirit thereof, it is understood that all matter herein described or illustrated is not limiting except as set forth in the appended claims.

What we claim is:

1. A process for the alkylation, alkenylation or arylation of salts of a metal selected from the group consisting of silver, gold, copper and mercury, which comprises reacting said metal salt with a trifunctional organo silane or a salt of an organopentafluorosilicic acid in the presence of a fluoride.

2. The process as claimed in claim 1, wherein the alkylation, alkenylation or arylation products of silver, gold or copper, which are unstable, are subsequently decomposed with formation of metallic silver, gold or copper, respectively.

3. Process according to claim 1, wherein the reaction is carried out in an aqueous medium.

4. Process according to claim 1 wherein the fluoride is ammonium fluoride.

5. Process according to claim 1 wherein the trifunctional organo-silane is a trifluoro-silane.

6. Process according to claim 5, wherein said trifluorosilane is phenyl trifluorosilane.

7. Process according to claim 5 wherein said trifluorosilane is methyl trifluorosilane.

8. Process according to claim 1, wherein said trifunctional organosilane is sodium vinyl siliconate.

References Cited

UNITED STATES PATENTS

| 1,987,685 | 1/1935 | Kharasch | 260—431 |
| 2,479,374 | 8/1949 | Krieble | 260—448.2 |
| 2,580,473 | 1/1952 | Sowa | 260—448.2 |
| 2,759,958 | 8/1956 | Fitch | 260—448.2 |
| 2,895,977 | 7/1959 | Fitch | 260—448.2 |

OTHER REFERENCES

Feiss: Organometallic Chemistry, Reinhold Publ. Corp. New York (1960), pp. 446–448.

TOBIAS E. LEVOW, *Primary Examiner.*

H. M. S. SNEED, *Assistant Examiner.*